A. R. POPE.
Burglar Alarm.
No. 566. Reissued June 8, 1858.
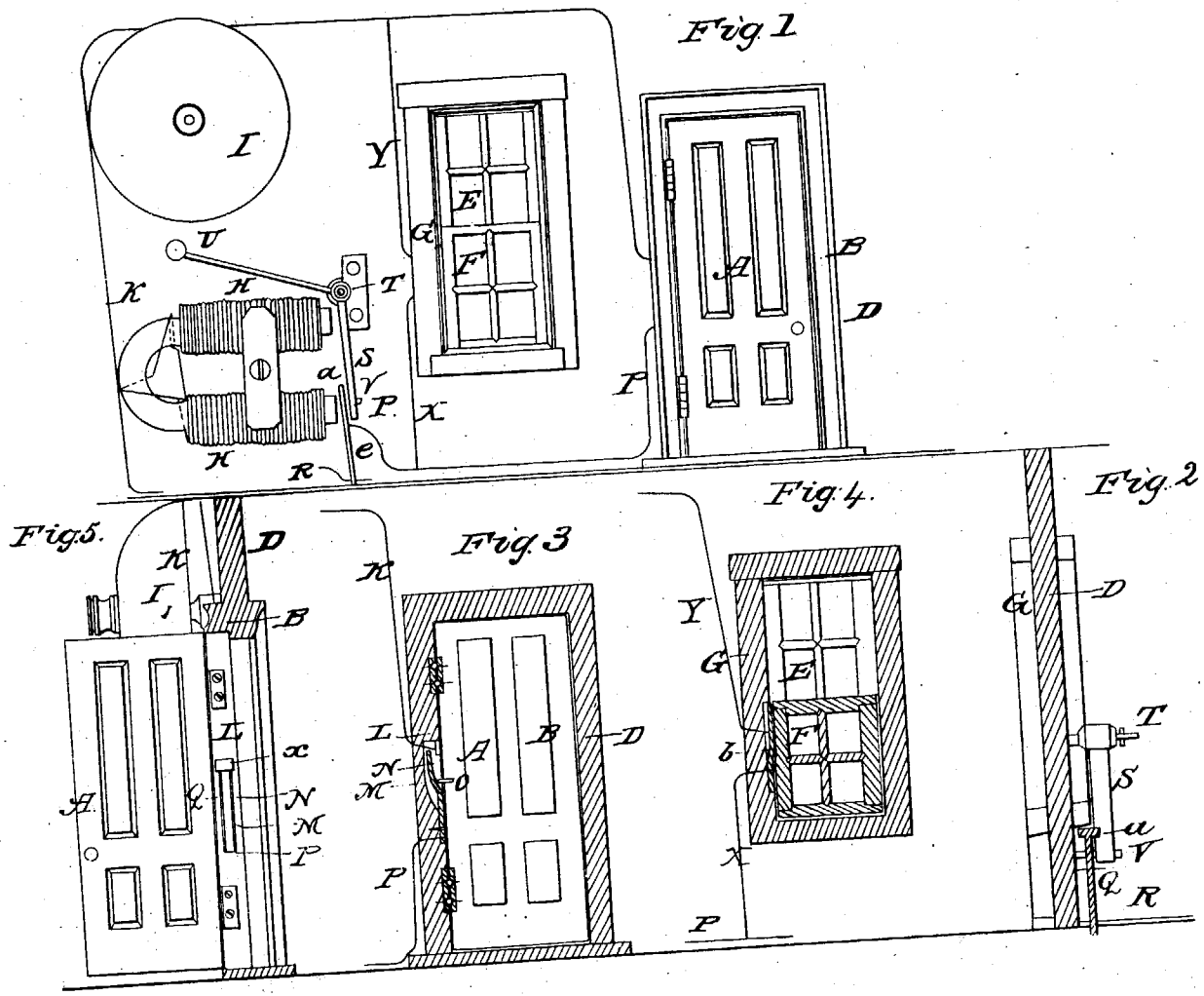
N. PETERS, Photo-Lithographer, Washington, D. C.

UNITED STATES PATENT OFFICE.

A. R. POPE, OF SOMERVILLE, MASSACHUSETTS.

IMPROVEMENT IN ELECTRO-MAGNETIC ALARMS.

Specification forming part of Letters Patent No. 9,802, dated June 21, 1853; Reissue No. 566, dated June 8, 1858.

*To all whom it may concern:*

Be it known that I, AUGUSTUS R. POPE, of Somerville, in the county of Middlesex and State of Massachusetts, have invented a new and useful or Improved Magnetic Alarm, to be applied to either a door or a window, or both, of a dwelling-house or other building for the purpose of giving an alarm in case of burglarious or other attempts to enter the same through said door or window by opening said door or window; and I do hereby declare that the same is fully described and represented in the following specification and the accompanying drawings, of which—

Figure 1 represents an elevation of a door and window and my apparatus as applied thereto. Fig. 2 is a vertical and transverse section taken through the spring circuit-breaker to be hereinafter described. Fig. 3 is a vertical section of the apparatus hereinafter termed the "key" as applied to the door. Fig. 4 is a section of the same as applied to the window.

In the said drawings, A represents a door, of which B is the frame, the same being shown as fitted into the wall D.

E and F are window-sashes of a window-frame, G. H is an electro-magnet, fastened to the side of the wall in a convenient position, and having a bell, I, arranged over or near to it. One of the pole-wires leading from an electric battery is seen at K. It extends to and winds around the magnet and passes upward over the bell and window-frame, and thence downward into the door-frame, where it is connected to a small stationary metallic plate, L, as seen in the drawings. This plate L is fastened to the door-frame and forms a part of the apparatus which I term the "key." The said key is otherwise composed of a metallic spring, M, one end of which is made to bear against the plate L, while the other or lower end is fastened to the door-frame, the spring being fixed in a recess, N, made in the door-frame.

In Fig. 5 a transverse section of the door-frame is given with the door represented as open.

The inner edge of the door has a small stud or pin, O, projecting from it, which constitutes a part of the key, and when the door is closed presses against the spring M of the key and bears it away from contact with the plate L. As soon as the door is opened a very short distance the stud will be so moved away from the spring as to allow the spring to come in contact with the plate L.

From the lower part of the spring a wire, P, extends nearly to the lower pole of the magnet and toward and against what I term the "spring circuit-breaker," which consists of a metallic spring, Q, extended upward from the other battery circuit wire R.

To the magnet there is applied a movable pendulous armature, S, which vibrates on a pin, T, and has a hammer, U, extended from it and toward and within a short distance from the under side of the bell. When this hammer is at rest, or down to its lowest position, it is retained there by a stop-pin, V, against which the lower part of the armature of the magnet rests under such circumstances.

The form and shape of the circuit-breaker and its relative position with respect to the armature and the wire P, that leads from the spring of the key, are shown in the drawings The top of the spring circuit-breaker is formed with a small projection, *a*, which extends into the path of the armature, so that when said armature is moved toward the magnet the projection of the circuit-breaker will be struck by the arm, so as to move the circuit-breaker out of contact with the end of the wire P.

The above constitutes the alarm apparatus as applied to a door. In the application of it to a window the wire P, or another wire, X, leading up from it, may be extended into the window-frame and connected with the lower end of a metallic spring, *b*, arranged on the inside or pulley stile of the frame and made to bear against the edge of a sash, the said edge being so formed or shaped that while the window is in the act of being raised it shall press the spring toward and against the end of another wire, Y, extended down from the wire K before named, or is an extension of said wire when the apparatus is to be applied to a window alone.

The spring and contrivance for moving it, as above described, as applied to a window, constitute what I term the "key."

The operation of the apparatus is as follows: While the door is closed or the window-sash down the magnetic circuit is broken, because the spring of the key is thrown out of connection with the upper wire of the door or window frame; but as soon as the door is opened or the window-sash moved, so as to allow the spring of the key to come into contact with the upper wire or the metallic plate at the lower end thereof, the circuit will be closed, the current of electricity being made to flow through the circuit-breaker and around the magnet. As soon as this takes place the magnet becomes charged and draws the armature toward it, and thereby throws the hammer of the bell against the bell. During the movement of the armature toward the magnet it throws or moves the circuit-breaker out of connection or contact with the wire P, whereby the circuit will be again broken, so as to demagnetize the magnet and allow the armature to fall back until the circuit-breaker again comes in contact with the wire P, and thereby closes the electric circuit and produces another blow of the hammer on the bell. Thus a constant succession of blows of the hammer on the bell will be produced.

By my apparatus I dispense with the use of clock-work or an apparatus to ring the bell through the agency of the falling of a weight or uncoiling of a spring, the hammer being kept in action on the bell while the battery continues to furnish electricity and the door or window is open.

I do not claim the communication of intelligence by the electric circuit and magnet as a part of my invention, or the vibration of the armature for this purpose; but I do claim—

1. The mode of breaking and completing the circuit, or vice versa—that is, by the spring circuit-breaker operating to cause the vibration of the armature.

2. So combining a hammer and bell with the self-vibrating armature that the vibrating of the latter shall produce a continued ringing of the bell under circumstances substantially as described.

3. The combination of these parts—viz., the circuit-breaker, hammer, bell, and vibrating armature—or their equivalent or equivalents, with a self-acting spring or key in a door or window, to operate so as not only to bring them automatically into action when the door or window is open, but maintain a continuous or continued ringing of the bell by the interruption of the electric current without the intervention of other machinery.

In testimony whereof I have hereunto set my signature.

AUGUSTUS R. POPE.

Witnesses:
R. H. EDDY,
F. P. HALE, Jr.